United States Patent [19]

Feldman

[11] Patent Number: 5,255,377
[45] Date of Patent: Oct. 19, 1993

[54] INTERFACE FOR ARBITRATING ACCESS TO THE PAGING UNIT OF A COMPUTER PROCESSOR

[75] Inventor: Erik L. Feldman, Santa Clara, Calif.

[73] Assignee: Intel Corporation, Santa Clara, Calif.

[21] Appl. No.: 962,157

[22] Filed: Oct. 15, 1992

Related U.S. Application Data

[63] Continuation of Ser. No. 434,447, Nov. 13, 1989, abandoned.

[51] Int. Cl.5 ................................................ G06F 9/30
[52] U.S. Cl. ..................... 395/325; 364/DIG. 1; 364/242.7; 364/254.3; 364/263.1
[58] Field of Search .......................................... 395/325

[56] References Cited

U.S. PATENT DOCUMENTS

| | | | |
|---|---|---|---|
| 4,375,639 | 3/1983 | Johnson, Jr. | 364/200 X |
| 4,384,323 | 5/1983 | Ahuja | 364/200 |
| 4,546,431 | 10/1985 | Horvath | 364/200 |
| 4,646,232 | 2/1987 | Chang et al. | 364/200 |
| 4,648,029 | 3/1987 | Cooper et al. | 364/200 |
| 4,654,777 | 3/1987 | Nakamura | 364/200 |
| 4,800,490 | 1/1989 | Tanaka et al. | 364/200 |
| 4,837,682 | 6/1989 | Culler | 364/200 |
| 4,870,704 | 9/1989 | Matelan et al. | 364/200 |
| 4,972,338 | 11/1990 | Crawford et al. | 364/200 |
| 4,989,138 | 1/1991 | Radochonski | 364/200 |

*Primary Examiner*—Thomas M. Heckler
*Attorney, Agent, or Firm*—Blakely, Sokoloff, Taylor & Zafman

[57] ABSTRACT

An arrangement in a microprocessor having both a segmentation addressing scheme and a page mode addressing scheme which arrangement reviews requests for use of the paging unit, determines whether a request has been sent by the different units, and allows access to the bus for a request by the segmentation unit if the bus is not in use, allows access to the bus for a request by the prefetch unit if the bus is not in use and a request is not also outstanding from the segmentation unit, and provides for reentering requests to use the bus which are started but not completed when submitted.

5 Claims, 3 Drawing Sheets

INTERFACE FOR ARBITRATING ACCESS TO THE PAGING UNIT OF A COMPUTER PROCESSOR

This is a continuation of application Ser. No. 07/434,447 filed Nov. 13, 1989, abandoned.

BACKGROUND OF THE INVENTION

1. Field of the Invention

This invention relates to computer circuitry and, more particularly, to methods and apparatus for arbitrating an interface in the addressing circuitry of a microprocessor.

2. History of the Prior Art

The 80486 microprocessor manufactured by Intel Corporation, Santa Clara, Calif., provides architecture which allows addressing in both segmentation and paging modes. In order to accomplish this, a segmentation unit is provided for generating thirty-two bit linear addresses used in segmentation addressing. These linear addresses are transferred to the paging unit where they are translated by means of page look-up tables to page addresses if paging is enabled. If paging is not enabled, the linear addresses generated by the segmentation unit are simply transferred through the paging unit and utilized without change as the physical addresses for accessing information in memory. Details of the addressing arrangement of the microprocessor are provided in a publication entitled i486, published by Intel Corporation, August 1989.

The microprocessor pipelines instructions for execution and utilizes a prefetch unit to assist with the pipelining. Linear addresses are also provided by the prefetch unit for accessing information. The linear addresses provided by the prefetch unit can also optionally be page relocated. In order not to have to duplicate the paging unit, addresses generated by both the segmentation unit and the prefetch unit are sent to the same paging unit. Since both of the segmentation unit and the prefetch unit may want to provide addresses at the same time, it is necessary to provide an arrangement for arbitrating the use of the linear address bus which is the input path to the paging unit.

SUMMARY OF THE INVENTION

It is, therefore, an object of the present invention to increase the speed of operation of a microprocessor circuit.

It is another more specific object of the present invention to provide high speed arbitration of the linear address bus in a microprocessor.

These and other objects of the present invention are realized in an arrangement which reviews requests for use of the paging unit, determines whether a request has been sent by the different units, allows access to the bus for a request by the segmentation unit if the bus is not in use, allows access to the bus for a request by the prefetch unit if the bus is not in use and a request is not also outstanding from the segmentation unit, and provides for reentering requests to use the bus which are started but not completed when submitted.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
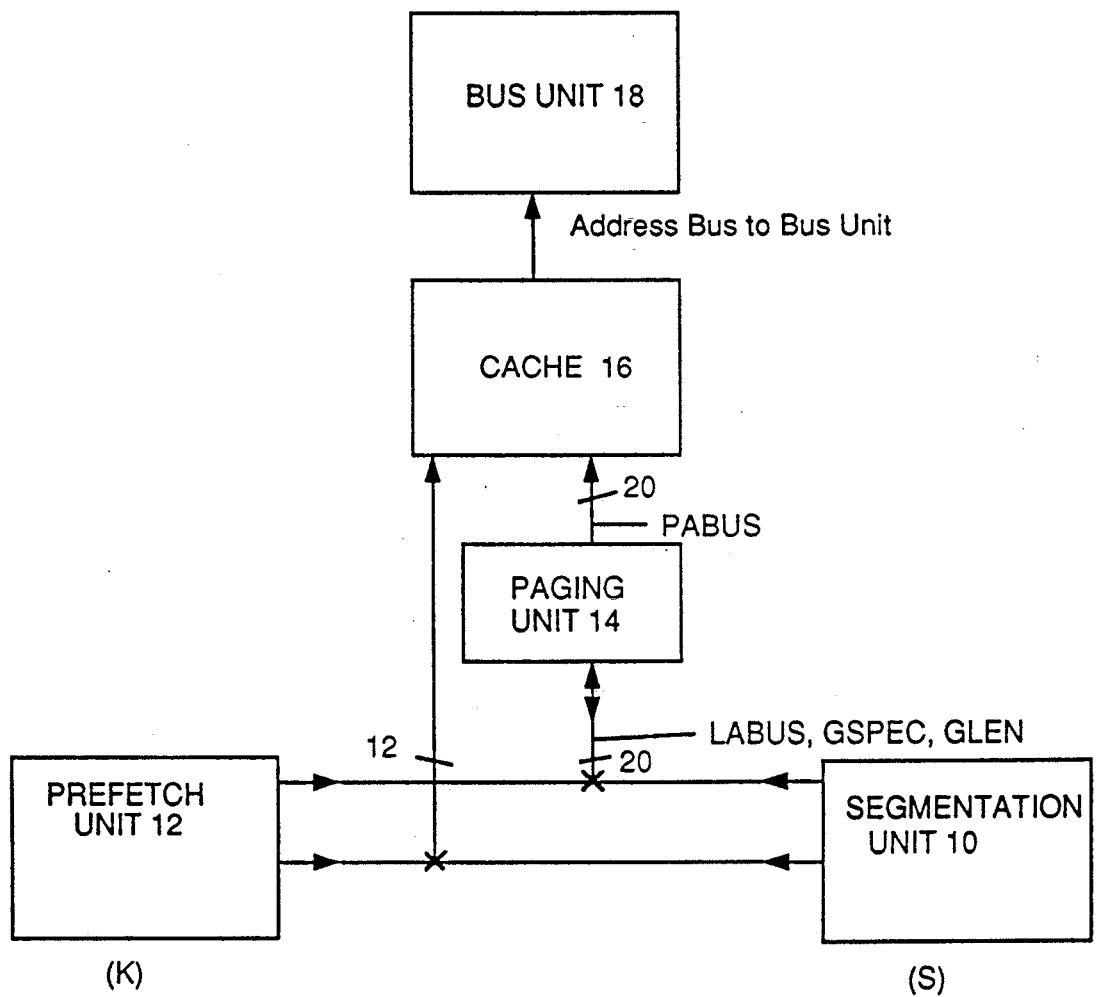
FIG. 1 is a block diagram illustrating the arrangement of portions of the addressing circuitry used in the present invention.

Referring now to FIG. 1 there are shown certain portions of the addressing circuitry of the Intel 80486 microprocessor. The circuitry illustrated includes a segmentation (S) unit 10, a prefetch (K) unit 12, a paging (P) unit 14, a cache 16, and a bus unit 18. Addresses used for accessing information in the microprocessor are generated in the S unit 10. These are 32-bit addresses referred to as linear addresses. If the microprocessor is operating in the segmentation mode, these addresses provide both the base address of the segment and the offset within the segment of the information being sought. These addresses are also the addresses utilized in addressing the on-chip cache of the microprocessor. When the paging unit 14 is not enabled, the linear addresses are transferred without modification through the P unit 14, to the cache 16, and on to the bus unit 18 for transfer to the external address bus.

The microprocessor also allows page mode addressing. If paging is enabled, the linear addresses generated by the S unit 10 are transferred to the P unit 14 where they are translated to the physical addresses used for accessing information. In such a case, the upper twenty bits of the linear address are translated by the P unit 14 while the lower twelve bits (the offset) remain the same and provide the offset within the page. The twenty bits translated by the P unit 14 and the lower twelve bits are recombined to give the physical address when the paging mode is enabled. From the P unit 14, the physical addresses are transferred to the cache 16 and to the bus unit 18 and placed on the physical address bus.

The cache 16 is actually a physical part of the prefetch (K) unit 12, and linear addresses are provided by the K unit 12 for accessing information. In order to eliminate the need for a separate paging unit for the K unit 12, the addresses generated by the K unit 12 are also routed through the P unit 14, the cache 16, and the bus unit 18 to the physical address bus. Since linear addresses may be generated by both the S unit 10 and the K unit 12 at the same time, it is necessary to provide apparatus for arbitrating access to the linear address bus to the P unit 14, the cache 16, and the physical address bus.

When a linear address is referred to the paging unit 14, the address could be translated through a series of look up tables to the physical address of the information. The look-up tables are external to the 80486 chip, however, so such a translation takes more than one clock of operation. However, the operation of the 80486 microprocessor is pipelined, and its effective operation requires that the paging unit be able to change one linear address to a physical address during each clock cycle. Therefore, the paging unit 14 utilizes a buffer unit referred to as a translation look aside buffer (TLB) which retains the values of linear addresses and the physical addresses associated therewith so that those physical addresses are immediately available. In this manner, the necessity to refer to look up tables to determine a physical address is obviated in most cases, and the operation proceeds much more rapidly.

The 80486 utilizes a two phase system clock; this allows different operations to take place in each of the two phases. A linear address is received in phase two of a first clock cycle. The lookup operation using the translation look aside buffer takes place in phase one of the next two phase clock cycle. The resultant physical address is driven on the physical address bus in phase one of the clock cycle in which the translation takes place. Consequently, arbitration of the linear addresses which are to be placed on the linear address bus has to be resolved in phase one of the first clock cycle.

The requests to place values on the linear address bus are Sreq from the S unit 10 and KQreq from the K unit 12, and each occurs in phase one. The largest number of requests originate from the S unit 10 so it is given priority in using the linear address bus. The S unit 10 gets the linear address bus when it requests the bus and the bus is not otherwise in use, and the K unit 12 gets the bus when the S unit 10 does not want the bus and it is not otherwise in use. However, the paging unit 14 needs to have a higher priority than either the S unit 10 or the K unit 12 for various reasons. For example, some requests take longer than one clock cycle to be completed. For example, if a linear-address-to-physical-address translation is commenced and the information is unavailable in the translation look aside buffer (a TLB miss occurs), the linear address bus must be frozen until the P unit 14 has had time to complete the translation through the lookup tables external to the 80486 chip. Consequently, there are situations where the P unit 14 must freeze the linear address bus to incoming requests. Thus, the P unit 14 has the highest priority, the S unit 10 has the next priority, and the K unit 12 has the lowest priority. When the P unit 14 wants the bus, it asserts the PLAbsy signal.

Since all addresses sent to the physical address bus precede through the cache 16, the cache 16 must also be able to stop requests from the other units during periods in which it must complete operations. For example, a cache miss requires that an access be done which goes out over the external bus. When data comes back from external memory, no requests can be run through the cache 16 while it is being filled. The cache 16 stalls the operations by asserting a Kbsy signal.

When the cache 16 stalls, a request which was being asserted has to be completed. This requires that requests be repeated by the P unit 14. The P unit 14 generates a PKbr signal to accomplish this. The P unit 14 also generates a Pbsy signal to inform the S unit 10 and the K unit 12 that any subsequent requests will have to be repeated by the requesting unit.

These operations of the system are accomplished by implementing the following rules in combinatorial logic to produce the desired result. These rules are:

The S unit 10 is allowed linear address bus access when the PLAbsy signal is not asserted.

The S unit 10 repeats its request when the cache 16 is busy or the P unit 14 is busy.

The K unit 12 is allowed linear address bus access when the PLAbsy signal is not asserted and an S unit request is not asserted.

The K unit 12 repeats its request when the cache 16 is busy or the P unit 14 is busy.

A P unit linear address bus access causes a PLAbsy signal.

The P unit repeat request is caused by the cache busy signal Kbsy.

The P unit 14 accepts an S unit request when PLAbsy is not asserted.

The P unit 14 accepts a K unit request when PLAbsy is not asserted and an S unit request is not asserted.

Figure 2:
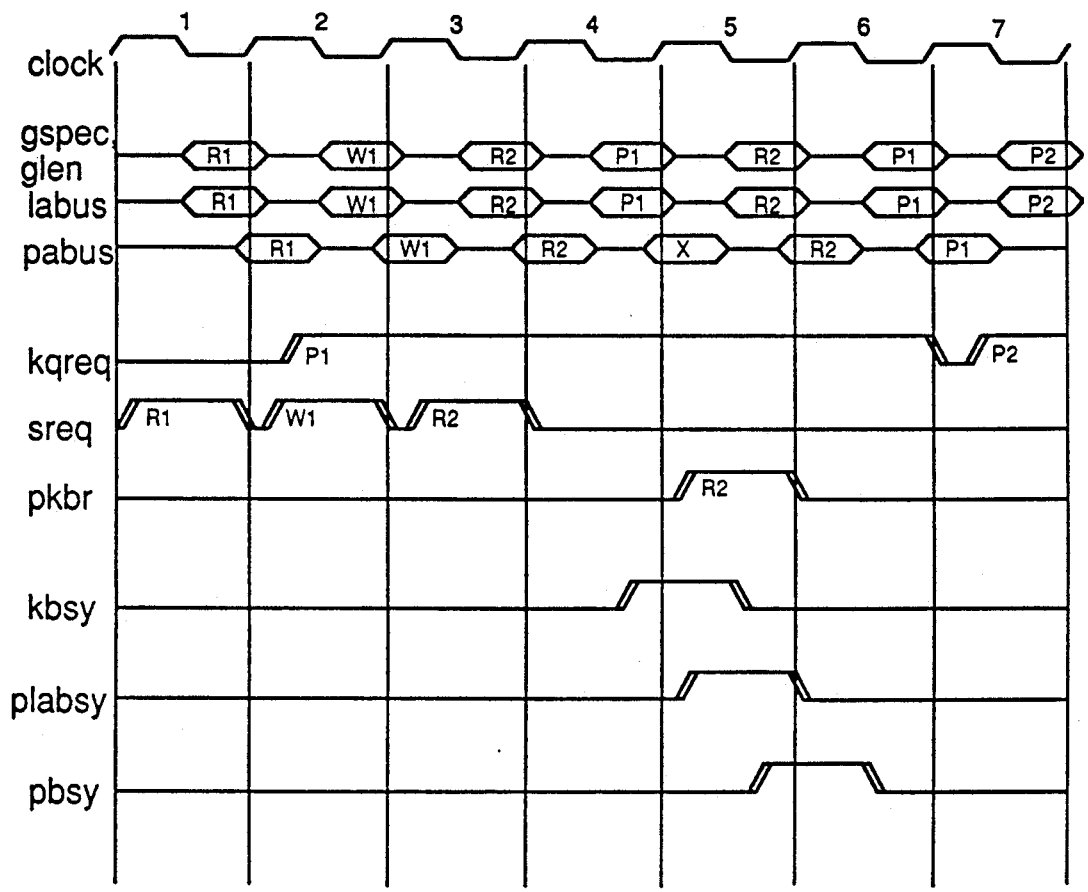
FIG. 2 is a timing diagram useful in illustrating the operation of the circuitry shown in FIG. 1.

The operation of the interface to carry out the implementation of these rules is demonstrated in the timing diagram of FIG. 2. In the timing diagram, a low value for a particular signal means that the signal is not asserted, and a high value means that the signal is asserted. In the diagram of FIG. 2, seven two-phase clock cycles are illustrated along the top of the figure. The signals Gspec and Glen indicate particular aspects of the signals driven onto the buses. For example, Gspec indicates whether a request is a read or a write and whether a request is to memory or input/output space. Glen indicates the length of the bus request. The labus and pabus signals indicate when signals are actually driven onto those buses. For ease of understanding, the particular signal driven onto the bus is labelled within the period of Gspec, Glen, labus, and pabus. The signal KQreq is the request for the linear address bus by the K unit 12. The signal Sreq is the request for the linear address bus by the S unit 10. The signal PKbr requests the cache 16 to process a P unit 14 request for the purpose of completing a previous request that has been stalled. The signal Kbsy indicates the cache 16 is busy. The signal PLAbsy indicates that the P unit 14 has control of the linear address bus and the bus is not to be driven. The signal Pbsy indicates that the P unit 14 is busy and causes requests for the linear address bus to be repeated.

Figure 3:
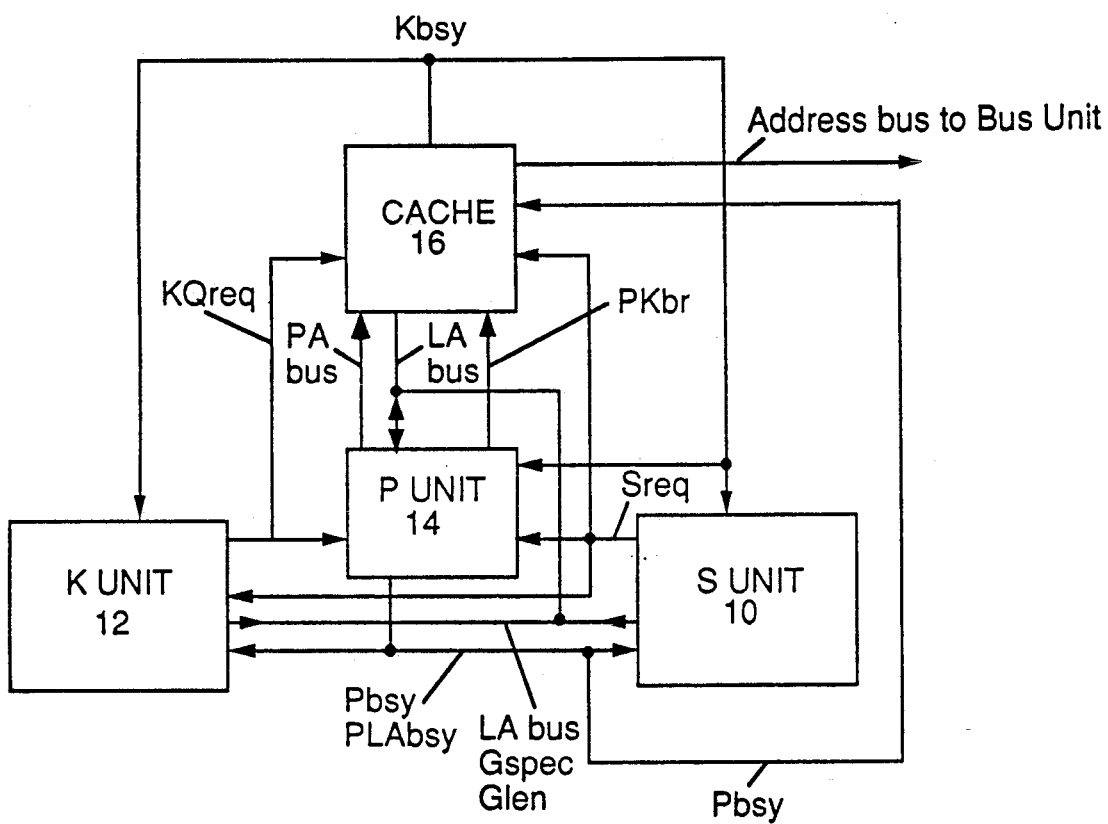
FIG. 3 is another illustration of the circuitry shown in FIG. 1 showing the paths for signals therebetween.

In order to facilitate the understanding of the timing diagram of FIG. 2, a block diagram is provided in FIG. 3 which illustrates the major components of the arrangements. Connecting these blocks are the paths for and directions of processing the various signals illustrated in FIG. 2 and elsewhere in this specification. As may be seen in FIG. 2, the Sreq requests are provided by the S unit 10 to the P unit 14, the K unit 12, and the cache 16; the KQreq requests are provided by the K unit 12 to the P unit 14, and the cache 16; the Pbsy signals are provided by the P unit 14 to the S unit 10, the K unit 12, and the cache 16; the PLAbsy signals are provided by the P unit 14 to the S unit 10 and the K unit 12; the Kbsy signal is provided by the cache 16 to the P unit 14, the S unit 10, and the K unit 12; and the PKbr signal is provided by the P unit 14 to the cache 16.

The timing diagram of FIG. 2 illustrates the basic flow of information through the interface. In phase one of clock cycle 1, the S unit 10 initiates a request for the linear address bus by asserting Sreq; the signal is designated R1 on the diagram and indicates that the request is to drive the linear address R1 on the linear address bus. This signal causes the P unit 14 to initiate a translation look aside buffer lookup in the next clock cycle of the linear address which is to be furnished on the linear address bus. In phase two of clock cycle 1, the address R1 from the S unit 10 is driven on the linear address bus, and the Gspec and Glen signals defining its parameters are provided on separate buses; since each linear address is always accompanied by Gspec and Glen signals defining the properties of the request, these separate buses are not shown in the drawing. It should be noted that during clock cycle 1, the cache 16 is not busy, the P unit 14 is not busy, and the pipeline is not frozen.

In phase one of clock cycle 2, the TLB lookup of the address from the S unit 10 results in a hit causing the physical address (labelled R1) to be driven onto the physical address bus during the same clock phase. During phase one of clock cycle 2, new requests are received from the S unit (W1) and the K unit (P1). The S unit request takes precedence over the K unit request. Since neither the P unit 14 nor the cache 16 is busy (no Pbsy and no Kbsy signals, respectively) indicating that the address from S unit request R1 has been processed, the S unit request initiates a TLB lookup in the next clock. During phase two of clock cycle 2, the S unit address corresponding to W1 is driven onto the linear address bus and its specifications are furnished.

In phase one of clock cycle 3, the TLB lookup of the address from the S unit request W1 results in a hit causing the physical address (labelled W1) to be driven onto the physical address bus during the same clock phase. During phase one of clock cycle 3, a new request R2 is received from the S unit; and the K unit (P1) continues to assert the request P1. Once again, the S unit request takes precedence over the K unit request. Since neither the P unit 14 nor the cache 16 are busy (no Pbsy and no Kbsy signals, respectively) indicating that the address from S unit request W1 has been processed, the S unit request initiates a TLB lookup in the next clock. During phase two of clock cycle 3, the S unit address corresponding to R2 is driven onto the linear address bus and its specifications are furnished.

In phase one of clock cycle 4, the TLB lookup of the address associated with the request R2 results in a hit causing the physical address (labelled R2) to be driven onto the physical address bus during the same clock phase. During phase one of clock cycle 4, no new request is received from the S unit 10; but the K unit 12 continues to assert the request KQreq for address P1. Consequently, the K unit request for address P1 is accepted, and the K unit linear address P1 is driven onto the linear address bus along with its characteristics. However, during phase 2 of clock cycles 4, the Kbsy signal is also asserted indicating that the cache 16 is busy and signaling the P unit 14 that the address from S unit request R2 has not been processed through the cache 16. In response to this signal, the P unit 14 causes the R2 values (linear address, Gspec, and Glen) to be latched into special registers within the P unit to wait for the stall to clear and the K unit 12 repeats request P1 in clock cycle 5.

The P unit 14 responds to the Kbsy signal by asserting PLAbsy during phase 1 of the fifth clock cycle. This has the effect of keeping the linear address bus free for repeating the R2 request, and all requests by the S unit 10 and the K unit 12 to use the linear address bus are turned down. In phase 1 of clock cycle 5, the P unit 14 asserts the PKbr signal to request the cache 16 to process request R2. At phase 2 of clock cycle 5, the linear address, Gspec, and Glen buses are driven by the P unit 14 with the R2 values which have been stored. The Pbsy signal is also asserted in phase 2 of clock cycle 5 to cause the K unit 12 to repeat the KQreq signal P1.

In phase 1 of clock cycle 6, the TLB hit for the R2 address occurs, and the physical address of R2 is driven on the physical address bus. The PLAbsy signal is deasserted freeing the linear address bus. In phase 2 of clock cycle 6, the linear address associated with the KQreq signal P1 is asserted on the linear address bus. The Pbsy signal is deasserted during this phase indicating that the KQreq signal P1 need not be repeated.

During phase 1 of clock cycle 7, the physical address P1 is asserted on the physical address bus, and a new KQreq P2 is asserted by the K unit 12. From this point on the pipeline continues its normal operation.

Thus, it may be seen that the present arrangement provides for the correct and orderly acceptance of information at the interface in accordance with the rules above stated so that the pipelining operations of the microprocessor are able to continue at their most expeditious pace.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a computer processor having a prefetch unit which is a first source of linear addresses and requests to use a linear address bus, a segmentation unit which is a second source of linear addresses and requests to use a linear address bus, a paging unit for translating linear addresses into physical addresses when paging is implemented and for transferring linear addresses as physical addresses when paging is not implemented, a physical address bus within the computer processor for receiving physical addresses from the paging unit, and a linear address bus within the computer processor adapted to receive linear addresses from the prefetch unit and segmentation unit for processing by the paging unit, the improvement comprising:

means in the paging unit for generating signals to indicate whether the paging unit is busy,
  means for selecting
    no linear addresses to be transferred from the linear address bus to the paging unit if the paging unit is busy;
    means for selecting a linear address from the segmentation unit to be transferred from the linear address bus to the paging unit if the paging unit is not busy and the segmentation unit has an address to be transferred to the paging unit; and
    means for selecting a linear address from the prefetch unit to be transferred from the linear address bus to the paging unit if the paging unit is not busy, the segmentation unit has no address to be transferred to the paging unit, and the prefetch unit has an address to be transferred to the paging unit.

2. In a computer processor as claimed in claim 1, the means for selecting also being means for selecting no linear addresses to be transferred from the linear address bus to the paging unit if access to the physical address bus is denied to the paging unit.

3. In a computer processor as claimed in claim 1, the improvement further comprising means in each of the prefetch unit and the segmentation unit for repeating requests to use the linear address bus where those requests have not been carried out because access to the physical address bus has been denied the paging unit.

4. In a computer processor as claimed in claim 1, each of the means for selecting being a physical part of the paging unit.

5. A computer processor comprising:
  a set of linear address conductors;
  a set of physical address conductors;
  prefetch unit means for providing linear addresses on the linear address bus and requests to utilize the linear address conductors;
  segmentation unit means for providing linear addresses on the linear address bus and requests to utilize the linear address conductors; and
  paging unit means for translating linear addresses placed on the linear address conductors into physical addresses and transmitting the physical addresses onto the physical address conductors,
  the paging unit means including
    means for sensing requests to use the linear address conductors,
    means for providing priority to requests from the segmentation unit means over requests from the prefetch unit means, and
    means for denying access to all linear addresses to be transferred from the linear address bus to the paging unit means if the paging unit means or the physical address bus is busy.

* * * * *